(12) United States Patent
Lupton, III et al.

(10) Patent No.: US 8,104,816 B2
(45) Date of Patent: Jan. 31, 2012

(54) STORAGE ASSEMBLY HAVING RETRACTABLE POWER CORD

(75) Inventors: Fred William Lupton, III, Saline, MI (US); Marc Daniel Reish, Grand Blanc, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/774,813

(22) Filed: May 6, 2010

(65) Prior Publication Data
US 2011/0272959 A1  Nov. 10, 2011

(51) Int. Cl.
*B60R 7/00* (2006.01)

(52) U.S. Cl. ............ 296/37.1; 296/24.34; 296/37.8; 296/37.12

(58) Field of Classification Search ........ 296/24.34, 296/37.1, 37.12, 37.8; 224/483
See application file for complete search history.

(56) References Cited

U.S. PATENT DOCUMENTS

| | | | | |
|---|---|---|---|---|
| 3,733,478 A * | 5/1973 | Barker | | 362/387 |
| 5,974,333 A | 10/1999 | Chen | | |
| 5,996,866 A | 12/1999 | Susko et al. | | |
| 6,379,178 B1 * | 4/2002 | Jones et al. | | 439/501 |
| 7,062,300 B1 | 6/2006 | Kim | | |
| 7,293,888 B2 | 11/2007 | Hutzel et al. | | |
| 2005/0151422 A1 | 7/2005 | Gilmour | | |
| 2007/0176449 A1 * | 8/2007 | Kukucka et al. | | 296/24.34 |
| 2009/0178844 A1 * | 7/2009 | Derocher et al. | | 174/500 |

* cited by examiner

*Primary Examiner* — Dennis Pedder
*Assistant Examiner* — Jason S Daniels
(74) *Attorney, Agent, or Firm* — Gifford, Krass, Sprinkle, Anderson & Citkowski, P.C.

(57) ABSTRACT

A storage assembly for use in a passenger compartment of a vehicle provides power to an electronic device from a vehicle power system. The storage assembly includes a storage bin having an exterior surface, an opening, and a storage space accessible through the opening. The storage assembly also includes a door having an outer surface which is pivotally coupled to the storage bin. A retractable cord is attached to a detachable member which is releasably attached to the storage bin. The retractable cord includes a first end having a first connector which is configured to connect the vehicle power system and a second end having a second connector configured to connect to the electronic device. A notch is formed in the housing adjacent the opening. The notch allows the second connector to extend beyond the exterior surface of the housing when a door is in the closed position.

20 Claims, 4 Drawing Sheets

US 8,104,816 B2

STORAGE ASSEMBLY HAVING RETRACTABLE POWER CORD

FIELD OF THE INVENTION

The invention relates to a storage assembly for use in a passenger compartment of an automotive vehicle. More particularly, the invention relates to a storage assembly having a removable retractable cord integrated into a storage bin which is accessible even when a door to the storage bin is in the closed position.

BACKGROUND OF THE INVENTION

Vehicle users carry an ever-increasing plurality of portable electronic devices such as phones, music players, GPS receivers, satellite radios, personal digital assistants and the like. In response vehicle manufacturers are striving to design flexible recharging options for the various electronic devices within the passenger compartment of the vehicle.

Traditionally, a user is required to purchase a device-specific charger in order to recharge an electronic device within a vehicle. The chargers or power cords connect the electronic devices to the vehicle power system via a power point (cigarette lighter) disposed in various locations within the passenger compartment including the dashboard, center console, or within a storage compartment. However, as the number of electronic devices a user carries increases, so does the number of power cords.

When the power cords are not in use, they take up valuable storage space within the passenger compartment. Storing multitude of power cords is problematic as the cords can become tangled. Further, placing the power point within a storage compartment is also problematic as it is inaccessible when the compartment is closed requiring a user is to first open the compartment and then sort through the stored items in order to charge the electronic device.

It is known to utilize retractable power cords disposed in various locations within the passenger compartment. The retractable power cords have one end fixedly connected to the vehicle power system and retract when not in use in order to provide additional storage space. However, as the retractable cords are fixed to the vehicle they are unable to keep pace with changing technology as the user is unable to swap out a retractable cord having an obsolete connector.

Thus, there exists a need for an improved retractable cord for use within a passenger compartment of an automotive vehicle which is capable of adapting with future advancements in technology and is accessible even from an enclosed storage compartment.

SUMMARY OF THE INVENTION

The present invention provides an improved storage assembly which overcomes the above-mentioned disadvantages.

In brief, a storage assembly for use in a passenger compartment of a vehicle which provides power to an electronic device from a vehicle power system is provided. The storage assembly includes a housing having an exterior surface and an opening. A storage bin having a storage space is accessible through the opening. The storage assembly also includes a door having an outer surface which is pivotally coupled to the storage bin. The door is movable between a closed position covering the opening and an open position to reveal the opening and allow access to the storage space.

A retractable cord is attached to a detachable member which is releaseably attached to the storage bin. The retractable cord includes a first end having a first connector which is configured to connect the vehicle power system and a second end having a second connector configured to connect to the electronic device. A notch is formed in the housing adjacent the opening. The notch allows the second connector to extend beyond the exterior surface of the housing when the door is in the closed position.

BRIEF DESCRIPTION OF THE DRAWINGS

A better understanding of the present invention will be had upon reference to the following detailed description when read in conjunction with the accompanying drawings, and wherein like reference characters refer to like parts throughout the several views and in which.

DETAILED DESCRIPTION OF A PREFERRED EMBODIMENT OF THE PRESENT INVENTION

The present invention has utility as a storage assembly which overcomes the above-mentioned disadvantages. The inventive storage assembly provides a retractable cord which is easily detachable to accommodate future connection advancements in portable electronic devices. Further, the storage assembly also allows a user to access the retractable cord even when the door of the storage bin is in the closed position.

Figure 1:
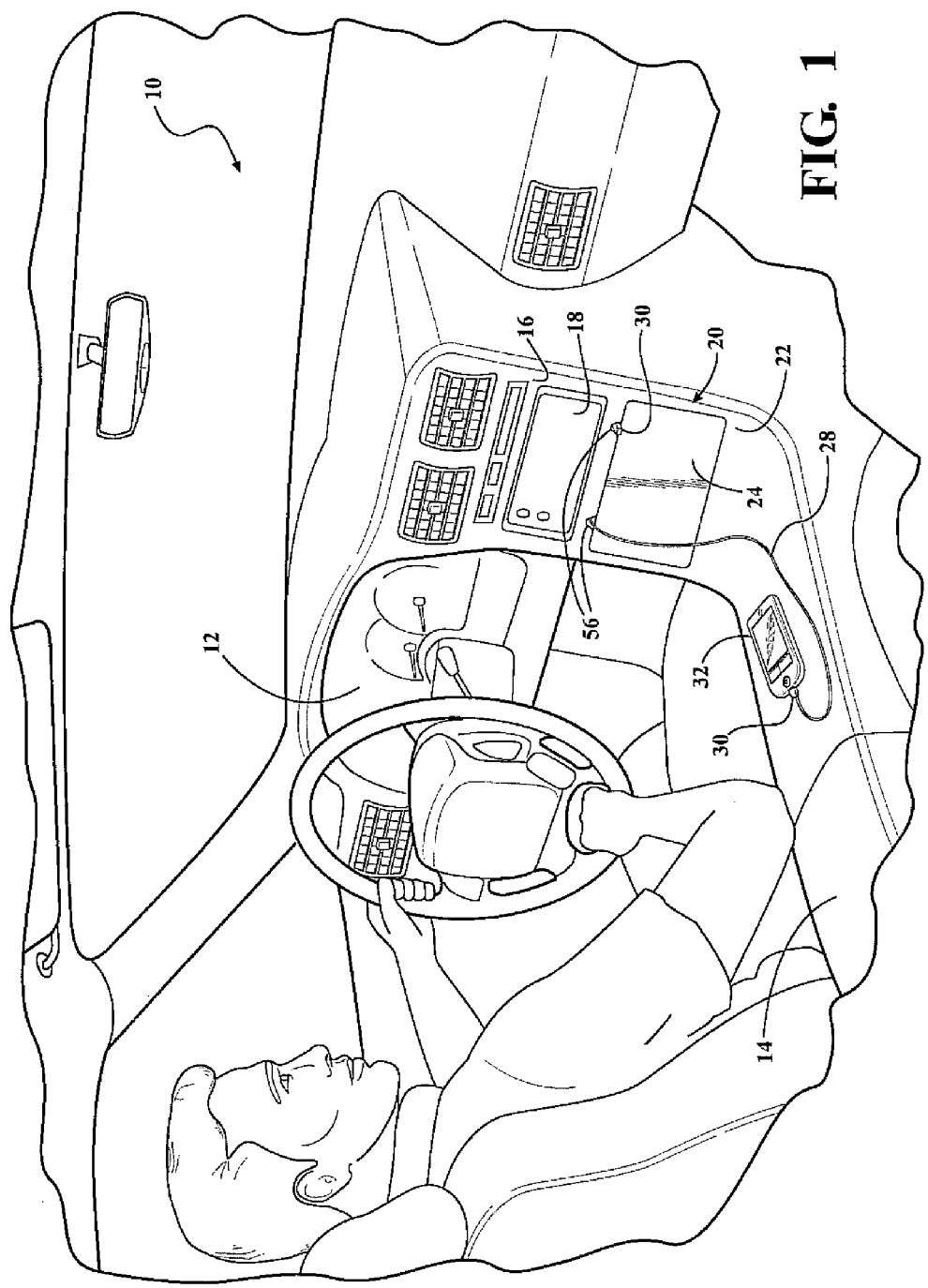
FIG. 1 is a perspective view illustrating a passenger compartment of an automotive vehicle having the inventive storage assembly with the door in the closed position.

With reference to FIG. 1, a passenger compartment of an automotive vehicle is generally indicated at 10. The passenger compartment 10 includes an instrument panel 12, a center console 14, and a display panel 16. A display unit 18 for use with a navigation device and other media systems including radios, CD players, and MP3 players is positioned within the display panel 16. The display panel 16 is formed of a single panel piece or of several panels connecting to provide a panel design which provides an aesthetically pleasing appearance to the passenger compartment 10.

A storage assembly 20 is positioned on the display panel 16 below the display unit 18. The storage assembly 20 includes a housing 22, a door 24, a storage bin 26, and a retractable cord 28. A distal end of the retractable cord 28 includes a plug 30 to connect to an electronic device 32 for recharging. The plug 30 is preferably a Universal Serial Bus (USB) male connection, although a female USB port or any other updated USB configuration, male or female, including USB 2.0, Micro USB, or Mini USB, is within the scope of the invention. The USB connection is preferably as a variety of USB charging adapters are available for an ever increasing number of portable electronic devices, thereby allowing a user having an adapter to charge a variety of devices from the retractable cord 28. Further, although the illustrated embodiments depict two retractable cords 28, the number of retractable cords 28 is not limited to such a depiction.

The housing 22 is optionally formed as a portion of the display panel 16; however, the housing 22 is not limited to such a location and is positionable at various locations within the passenger compartment 10 including the instrument panel 12 and the center console 14. The housing 22 includes an exterior surface 34 facing the passenger compartment 10, and an opposite interior surface 36. An opening 38 is formed within the housing 22 and extends from the exterior surface 34 to the interior surface 36.

The storage bin 26 has an end wall 40, top wall 42, bottom wall 44, and opposed side walls 46 and 48 which connect to define a storage space 50. The storage bin 26 is attached to the housing 22 so that the storage space 50 is accessible through the opening 38. As described in greater detail below the retractable cord 28 is detachably coupled to the end wall 40.

Figure 2:
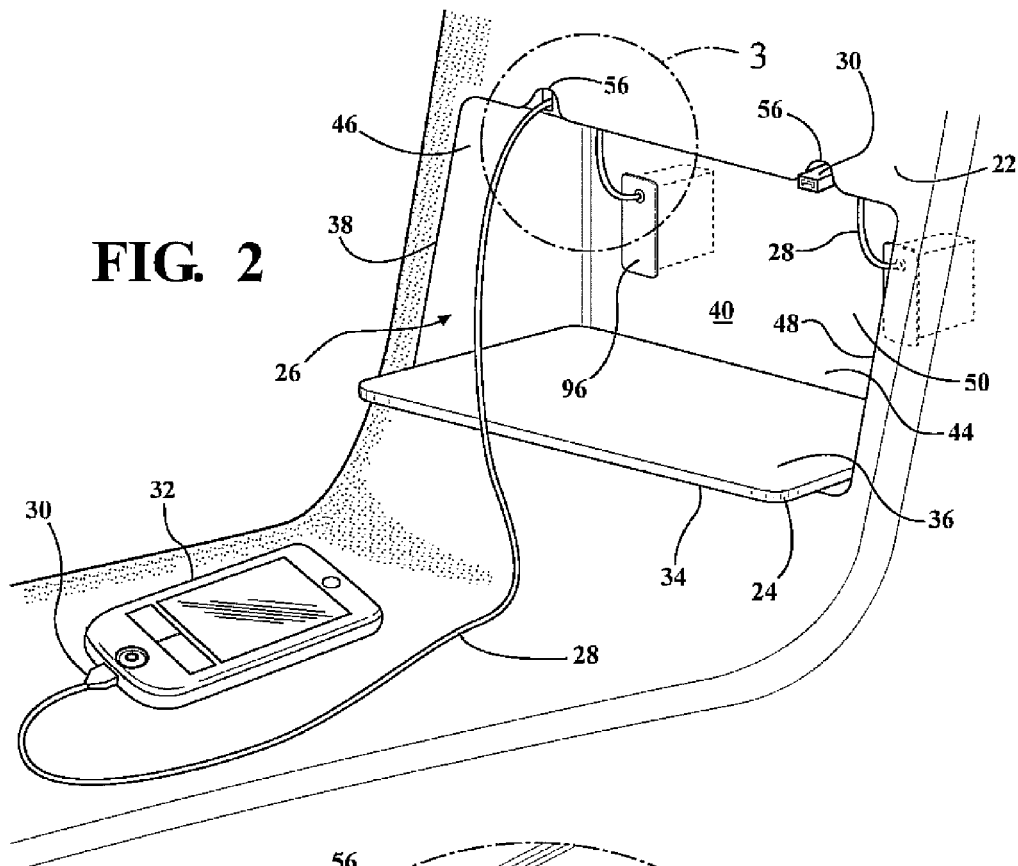
FIG. 2 is a perspective view illustrating the inventive storage assembly with the door in the open position.
Figure 5:
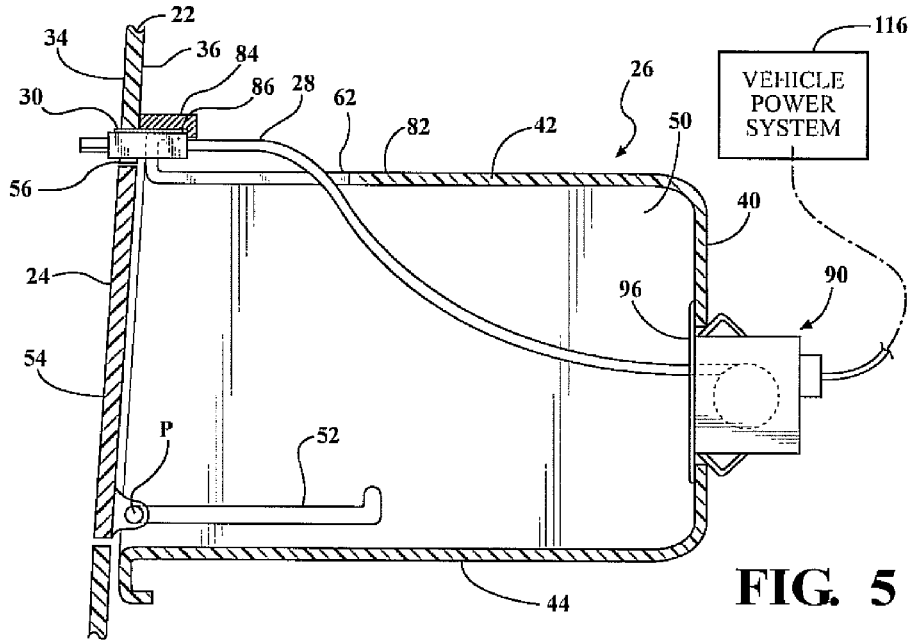
FIG. 5 is a partial cross-sectional view taken along line 5-5 of FIG. 4B.

As best seen in FIG. 5, the door 24 is pivotally coupled to storage bin 26 for movement between a closed position and an open position. The door 24 includes a pivot arm 52, disposed on each side of the door 24, which pivotally connects to the side walls 46 and 48 of the storage bin 26 at points P. As seen in FIGS. 1 and 5, an outer surface 54 of the door 24 extends coextensively with the exterior surface 34 of the housing 22 and thereby restricts access to the storage space 50 when the door 24 is in the closed position. In the open position the door 24 reveals the opening 38 thereby allowing access to the storage space 50, as seen in FIG. 2.

A notch 56 is formed on the housing 22 adjacent the opening 38. The notch 56 allows a portion of the retractable cord 28 to extend beyond the exterior surface 34 of the housing 22 when the door 24 is in the closed position, as seen in FIG. 1. In the illustrated embodiments, the notch 56 is positioned adjacent the top wall 42 of the storage bin 26; however, it is appreciated that the notch 56 is not limited to such a position, and is optionally disposed at other positions along the perimeter of the opening 38.

Figure 3:
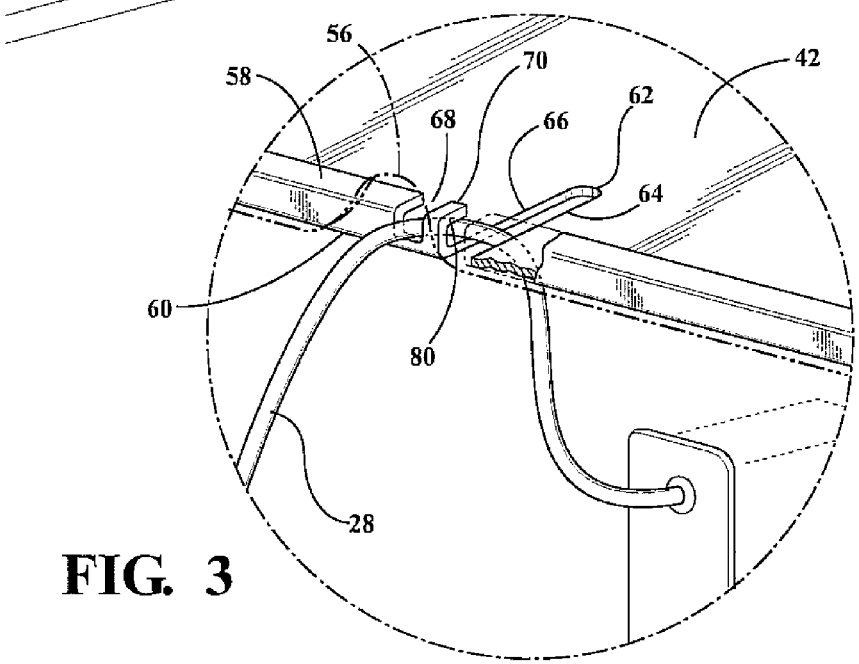
FIG. 3 is an enlarged view of the circled portion of FIG. 2.
Figure 4A:
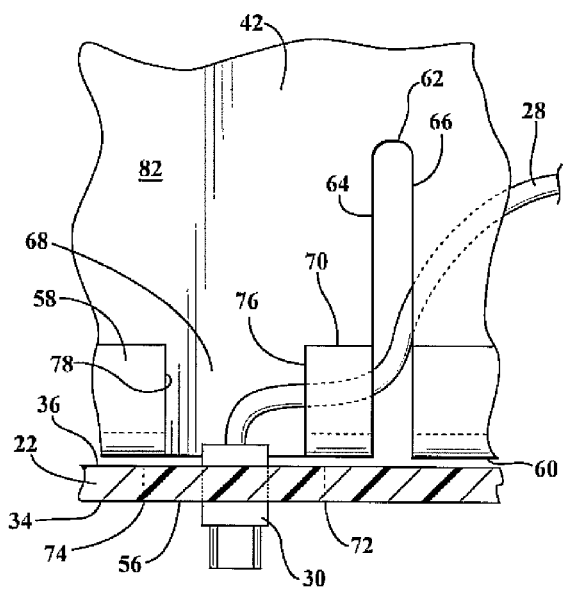
FIG. 4A is a top plane view of the storage assembly illustrating one embodiment of the invention.

As seen in FIGS. 3 and 4A, a ridge 58 extends outwardly from a distal end 60 of the top wall 42. A slot 62 having a first side 64 and a second side 66 extends through the ridge 58 and from the distal end 60 through a portion of the top wall 42. The ridge 58 includes a gap 68 spaced apart from the slot 62. A hook 70 is disposed on the distal end 60 of the top wall 42 between the slot 62 and the gap 68.

The notch 56 is dimensioned to extend across the slot 62, the hook 70, the gap 68, and a portion of the ridge 58. Optionally, a first edge 72 of the notch 56 is aligned with the second side 66 of the slot 62 and a second edge 74 of the notch aligns with a portion of the ridge 58 on the opposite side of the gap 68 from the slot 62. In the alternative, the first edge 72 is aligned with the first side 64 and the second edge 74 aligns with a portion of the ridge 58 on the opposite side of the gap 68 from the slot 62. In another embodiment, first edge 72 of the notch 56 aligns with a first edge 76 of the ridge 58 (a side of the hook 70 in this embodiment), and the second edge 74 aligns with either a portion of the ridge 58 or the second edge 78 of the ridge 58. In still another embodiment, the first edge 72 of the notch 56 is aligned with either the first side 64 or second side 66 of the slot 62 and the second edge 74 aligns with the second edge 78 of the ridge 58.

Figure 6A:
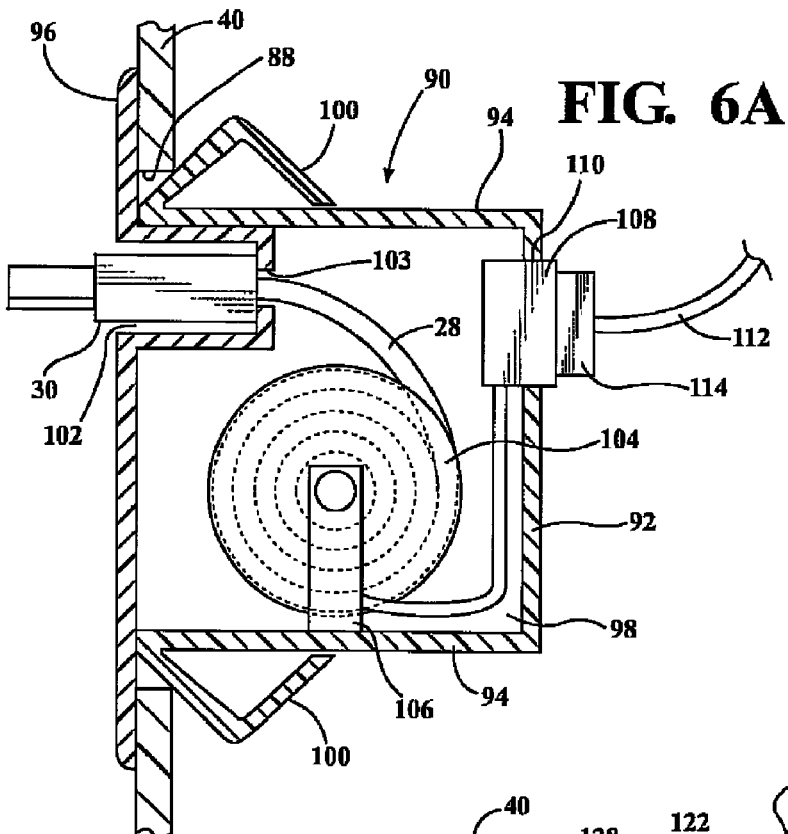
FIG. 6A is a partial cross-sectional view of the connection of the retractable cord to the storage bin.
Figure 6B:
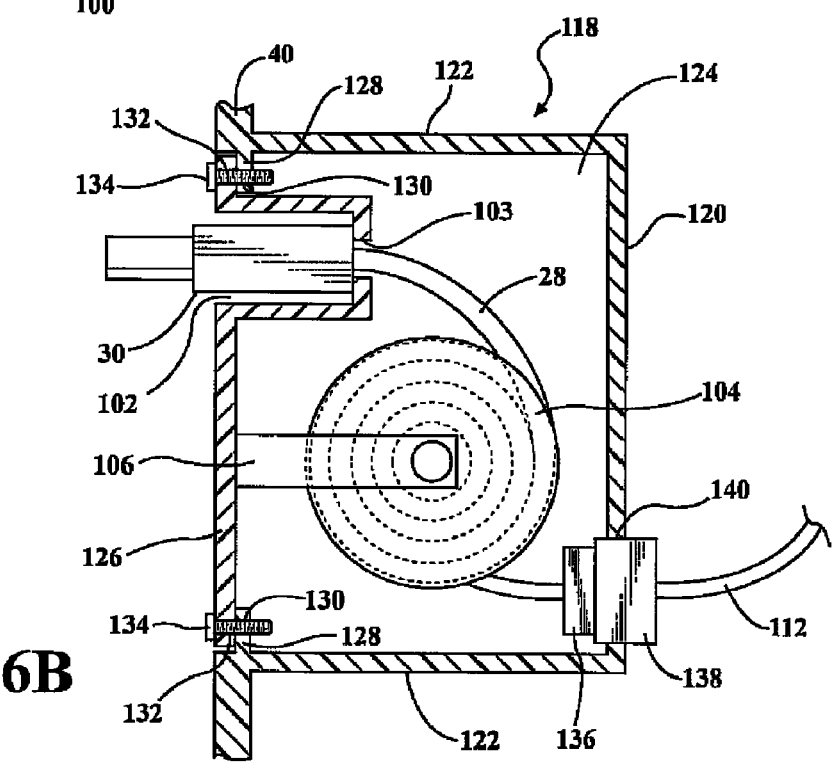
FIG. 6B is a partial cross-sectional view illustrating an alternative connection of the retractable cord to the storage bin.

In operation, a user grasps the plug 30 from the full retracted position, as seen in FIGS. 6A and 6B, and extends the retractable cord to the desired length. A portion of the retractable cord 28 is then placed through the slot 62 exiting the storage space 50, and is manipulated over the hook 70 and through the gap 68. The retractable cord 28 is releasably secured between a bottom side 80 of the hook 70 and a top side 82 of the top wall 42 such that the plug 30 extends through the notch 56 and beyond the exterior surface 34 of the housing 22. The plug 30 can be in the set position with the plug 30 within the notch 56, as seen in FIG. 4A, or in the use position with the plug 30 and a portion of the retractable cord 28 extended to connect to the electronic device 32 as seen in FIG. 2.

In the set position, a user is able to access the plug 30 even when the door 24 is in the closed position. The set position is advantageous as a user is not required to open the door 24 and sort through any items stored in the storage space to access the plug 30 from the fully retracted position. The user needs only to grasp the plug 30 and pull to extend the retractable cord 28 to any desired length. The portion of the retractable cord 28 between the bottom side 80 of the hook 70 and the top side 82 of the top wall 42 prevents inadvertent retraction of the retractable cord 28 while allowing the extension of the retractable cord 28. To retract the plug 30 from the use position back to the set position, the user manipulates the portion of the retractable cord 28 out of engagement with the hook 70, with a portion of the retractable cord 28 still exiting the storage space 50 through the slot 62, allowing the retractable cord 28 to retract to the set position and then reengaging the hook 70. To retract the plug 30 from the use or set positions, the user manipulates the portion of the retractable cord 28 out of engagement with the hook 70 and the slot 62, allowing the retractable cord 28 to retract to the fully retracted position.

Figure 4B:
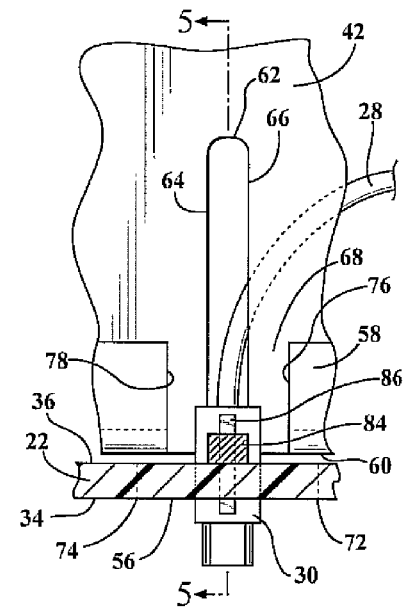
FIG. 4B is a top plane view of the storage assembly illustrating an alternative embodiment.

With reference to FIG. 4B, an alternative attachment of the plug 30 within the notch 56 is illustrated. In this embodiment the slot 62 is centered with respect to the notch 56 and the gap 68. The plug 30 is releasably secured within the notch 56 by a magnet 84 attached to the interior surface 36 of the housing 22. The magnet 84 magnetically secures plug 30 within the notch 56. Optionally, a strip of ferrous or metallic material 86 is attached to a top side of the plug 30 to provide reliable magnetic attraction between the magnet 84 and the plug 30. In an alternative embodiment, a two part hook and loop type fastener, commonly sold under the trade name VELCRO®, is used in place of the magnet 84 and the metallic material 86.

The notch 56 is dimensioned to extend across the slot 62 onto a portion of the ridge 58 on either side of the gap 68, as seen in FIG. 4B. In the alternative, the first edge 76 of the ridge 58 is aligned with the first edge 72 of the notch 56, and the second edge 78 of the ridge 58 is aligned with the second edge 74 of the notch 56.

It is appreciated, of course, that in either embodiment the notch 56 is formed in a variety of shapes, includes semicircular, straight sides with a circular top, square, rectangular, triangular, or any other shape. In addition, the notch 56 optionally, includes an ornamental or decorative edge such a trim or chromed coating.

With reference to FIG. 6A, the attachment of the retractable cord 28 to the storage bin 26 will now be discussed. The end wall 40 of the storage bin 26 includes an opening 88 in which a detachable member in the form of a container 90 is releasably attached. The container 90 includes a base wall 92, two pair of opposing side walls 94, and a cover 96 defining an enclosed space 98. The container 90 houses the retractable cord 28 within the enclosed space 98.

Spring loaded snap posts 100 extend from the side walls 94 to releasably lock the container 90 within the opening 88 through compression of the end wall 40 between the cover 96 and the snap posts 100. Upon insertion of the container 90 within the opening 88 the snap posts 100 deflect and flatten to pass through the opening 88 until the cover 96 which is larger than the opening 88 contacts the end wall 40. During removal of the container 90, the snap posts 100 deflect and flatten to pass through the opening 88.

The snap posts 100 allow the container 90 to be easily inserted and removed from the opening 88 thereby providing a retractable cord 28 having a removable design which can be updated to keep pace with changes in technology. Further, as the entire container 90 is detachable from the end wall 40 of the storage bin 26, a user is provided with options in the type of retractable cord 28 installed, illustratively including a specific plug 30 for recharging a specific electronic device or a specific type of USB plug or port.

The cover 96 includes a cavity 102 to receive a portion of the plug 30 to recess a portion of the plug 30 from the storage space 50. The cavity 102 includes an aperture 103 dimensioned to allow the retractable cord 28 to pass through but not the plug 30. The plug 30 is positioned on one side of the cover 96 in the storage space 50 with the retractable cord 28 extending through the aperture 103. The remaining portion of the retractable cord 28 is disposed within the enclosed space 98 on the other side of the cover 96.

The retractable cord is optionally several feet in length, with a majority of the length wound around a retraction mechanism 104, such as a conventional spring loaded spool, positioned within the enclosed space 98. A post 106 attaches the retraction mechanism 104 to either the base wall 92 or the side walls 94 of the container 90. It is appreciated that the retractable cord 28 is retractable by any known means to those of ordinary skill in the art including various types of spring loaded reels and power re-winders.

As a user pulls the plug 30 from the fully retracted position, with the plug 30 seated within the recessed cavity 102 as seen in FIGS. 6a and 6B, to the extended position the retraction mechanism 104 winds the remaining portion of the retractable cord 28 under tension which biases the retractable cord 28 back to the fully retracted position. The retraction mechanism 104 further includes a locking mechanism which locks the retractable cord 28 in the extended position allowing a user to release the retractable cord 28 without automatic retraction. The locking mechanism is optionally a ratchet or lock mechanism known to those of ordinary skill in the art which releases upon the sudden application of a pulling force on the retractable cord 28.

A vehicle connector 108 is disposed on the retractable cord 28 at the end opposite the plug 30. The vehicle connector 108 extends through an aperture 110 formed in the base wall 92 of the container 90. The vehicle connector 108 electrical connects to a vehicle wiring harness 112 by wiring harness connector 114. The vehicle connector 108 and the wiring harness connector 114 are connectable in any known fashion, for example standard male and female wire harness connections. The wiring harness connector 114 is optionally secured to a support structure of the vehicle such that upon insertion of the container 90 into the opening 88, the vehicle connector 108 connects to the wiring harness connector 114 allowing installation of the container 90 to the storage bin 26 and electrical connection of the retractable cord 28 in one step.

The wiring harness 112 attaches to a vehicle power system 116, as seen in FIG. 5, such as the vehicle battery or an electronic control unit so as to supply electronic power to the retractable cord 28. As such the electronic device 32 is connected to the vehicle power system 116 via the retractable cord 28, allowing the electronic device 32 to be recharged.

In addition, as the retractable cord 28 is preferably a USB cord allowing the two-way communication of data and the one way communication of power between the vehicle and the electronic device, the wiring harness 112 is optionally connected to other vehicle systems illustratively including the audio system, a hands free mobile phone system, the navigation system, or the display unit 18. The USB connections allows the electronic device 32 to be recharged by the vehicle power system 116 and to interact with the various vehicles systems, to transfer content, control the audio playing from the audio system, connect the phone to a hands free system, display navigation information from the portable navigation system on the display unit 18, etc.

With reference to FIG. 6B, an alternative the connection of the retractable cord 28 with the storage bin 26 is illustrated. The end wall 40 of the storage bin 26 includes a chamber 118 having a rear wall 120 and two pair of opposing side walls 122 which define an enclosed space 124. The retraction mechanism 104 is attached to a detachable member in the form of a lid 126 by the post 106. The lid 126 is dimensioned to fit within an open end of the chamber 118, and lay flush with the end wall 40. A recessed cavity 102 is formed in the lid 126 to receive a portion of the plug 30, and includes an aperture 103 dimensioned to allow the retractable cord 28 to pass through but not the plug 30. The plug 30 is positioned on one side of the lid 126 in the storage space 50 with the retractable cord 28 extending through the aperture 103. The remaining portion of the retractable cord 28 is disposed within the enclosed space 124 on the other side of the lid 126.

Tabs 128 extend from side walls 122 and include apertures 130 which correspond to apertures 132 formed in the lid 126. Fasteners 134 extend through apertures 130 and 132 to releasably secure the lid 126, and consequently the retractable cord 28, to the chamber 118. The fasteners 134 illustratively included screws, bolts, clips, or any other type of fastener known to those of ordinary skill in the art to releasably attach one object to another. It is appreciated of course that the apertures 132 are counter bored so that fasteners 134 are flush with the lid 126.

The vehicle connector 136 connects to the wiring harness connector 138 and extends through an aperture 140 formed in the rear wall 120 of the chamber 118. The wiring harness 112 connects to the vehicle power system 116, and optionally various other vehicle systems, as stated above. As the retractable cord 28 is entirely attached to the detachable lid 126 via the post 106, the retractable cord 28 is easily removable upon unfastening of fasteners 134 and the disconnection of the vehicle connector 136 from the wiring harness connector 138. Thereby allowing the retractable cord 28 to be easily upgraded or repaired.

It is appreciated that the detachable members in the form of the container 90 and the lid 126 are positioned outside of the storage bin 26. The opening 88 and the chamber 118 are formed at various locations within the passenger compartment 10 of the vehicle including the instrument panel 12, the center console 14, the display panel 16, door, ceiling, trunk, or cargo bay. The container 90 and the lid 126 install within the opening 88 and the chamber 118, respectively, as described above, to provide a detachable retractable cord 28 at any location suitable to provide a user with various recharging options. In addition, the container 90 is optionally releasably positioned within the chamber 118 with the vehicle connector 108 extending though aperture 110 to connect to the wiring harness connector 138 extending through aperture 140. In the alternative, the lid 126 is optionally releasably positioned within the opening 88 having tabs 128 and apertures 130, or is releasably positioned within the opening 88 by snap posts 100 extending outwardly from the lid 126.

From the foregoing, it can be seen that the present invention provides a storage assembly having a retractable cord for recharging a portable electronic device which is modular allowing for the easy detachment of the retractable cord for service, to provide a particular connector for the portable electronic device, or for keeping pace with the advancement in technology. Further, the retractable cord is accessible by a user even when the door to the storage bin is in the closed position as a portion of the plug extends beyond an exterior surface of the housing. Having described the invention, however, many modifications thereto will become apparent to those skilled in the art to which it pertains without deviation from the spirit of the invention as defined by the scope of the appended claims.

It is claimed:

1. A storage assembly for use in a passenger compartment of a vehicle which provides power to a portable electronic device from a vehicle power system, said storage assembly comprising:
   a storage bin having an interior storage space;
   a detachable member releasably attached within said interior storage space of said storage bin; and
   a retraction mechanism having a retractable cord, said retraction mechanism operable to position said retractable cord between a retracted position and an extended position, said retraction mechanism is attached to said detachable member, said retractable cord having a first connector at a first end and a second connector at a second end, said first connector configured to connect to the vehicle power system, and said second connector configured to connect to the electronic device.

2. The storage assembly of claim 1, wherein said storage assembly includes a housing having an exterior surface and an opening, and wherein said storage space is accessible through said opening.

3. The storage assembly of claim 2, wherein a door is pivotally coupled to said storage bin for movement between a closed position and an open position.

4. The storage assembly of claim 3, wherein a notch is formed in said housing adjacent said opening, said notch allowing said second connector to extend beyond said exterior surface of said housing when said door is in said closed position.

5. The storage assembly of claim 4, wherein a slot is formed in said storage bin adjacent said notch, said slot receiving said retractable cord such that a portion of said retractable cord exits said storage space, and wherein a hook extends from said storage bin adjacent said slot to releasably secure said second connector within said notch.

6. The storage assembly of claim 4, wherein a slot is formed in said storage bin adjacent said notch, said slot receiving said retractable cord such that a portion of said retractable cord exits said storage space, and wherein a magnet is attached to an interior surface of said housing to releasably secure said second connector within said notch.

7. The storage assembly of claim 4, wherein said retractable cord is a universal serial bus allowing two way communication of data and one way communication of power between the electronic device and the vehicle.

8. The storage assembly of claim 1, wherein said storage bin includes an end wall having an opening, and wherein said detachable member is disposed within said opening of said end wall.

9. The storage assembly of claim 8, wherein said detachable member is a container having a base wall, two pair of opposing side walls and a cover defining an enclosed space, said retraction mechanism being disposed within said enclosed space of said container, and wherein said cover includes an aperture through which said retractable cord extends such that said second connector is positioned on one side of said cover and a remainder of said retractable cord is positioned on an opposite side of said cover in said enclosed space.

10. The storage assembly of claim 9, wherein said cover includes a recessed cavity for receiving a portion of said second connector.

11. The storage assembly of claim 10, wherein said first connector extends through an aperture formed in said base wall to connect to the vehicle power system.

12. A storage assembly for use in a passenger compartment of a vehicle to provide power to a portable electronic device from a vehicle power system, said storage assembly comprising:
    a storage bin having an end wall and two pair of opposing side walls extend from said end wall to define an interior storage space,
    a chamber having an open end formed in said end wall;
    a detachable member releasably attached to said open end of said chamber; and
    a retraction mechanism having a retractable cord, said retraction mechanism operable to position said retractable cord between a retracted position and an extended position, said retraction mechanism is attached to said detachable member, said retractable cord having a first connector at a first end and a second connector at a second end, said first connector configured to connect to the vehicle power system, and said second connector configured to connect to the electronic device.

13. The storage assembly of claim 12, wherein said storage bin includes a door pivotally coupled to said storage bin for movement between a closed position preventing access to said storage space and an open position.

14. The storage assembly of claim 12, wherein said detachable member includes an aperture through which said retractable cord extends such that said second connector is positioned on one side of said detachable member and a remainder of said retractable cord is positioned on an opposite side of said detachable member in said chamber.

15. The storage assembly of claim 14, wherein said detachable member includes a recessed cavity for receiving a portion of said second connector.

16. The storage assembly of claim 13, wherein said storage assembly further includes a housing having an exterior surface and an opening, and wherein said storage space is accessible through said opening.

17. The storage assembly of claim 16, wherein a notch is formed in said housing adjacent said opening, said notch allowing said second connector to extend beyond said exterior surface of said housing when said door is in said closed position.

18. The storage assembly of claim 17, wherein a slot is formed in said storage bin adjacent said notch, said slot receiving said retractable cord such that a portion of said retractable cord exits said storage space, and wherein a hook extends from said storage bin adjacent said slot to releasably secure said second connector within said notch.

19. The storage assembly of claim 17, wherein a slot is formed in said storage bin adjacent said notch, said slot receiving said retractable cord such that a portion of said retractable cord exits said storage space, and wherein a magnet is attached to an interior surface of said housing to releasably secure said second connector within said notch.

20. The storage assembly of claim 12, wherein said retractable cord is a universal serial bus allowing two way communication of data and one way communication of power between the electronic device and the vehicle.

* * * * *